Jan. 1, 1946.  E. W. GOSSWILLER  2,392,142
PANORAMIC TYPE GUNNERY TRAINER
Filed Jan. 8, 1944  7 Sheets-Sheet 1

INVENTOR
Earl W. Gosswiller
Carlson, Pitzner, Hubbard & Wolfe
ATTORNEYS

Jan. 1, 1946.  E. W. GOSSWILLER  2,392,142
PANORAMIC TYPE GUNNERY TRAINER
Filed Jan. 8, 1944  7 Sheets-Sheet 3

INVENTOR
Earl W. Gosswiller
Carlson, Pitzner, Hubbard & Wolfe
ATTORNEYS

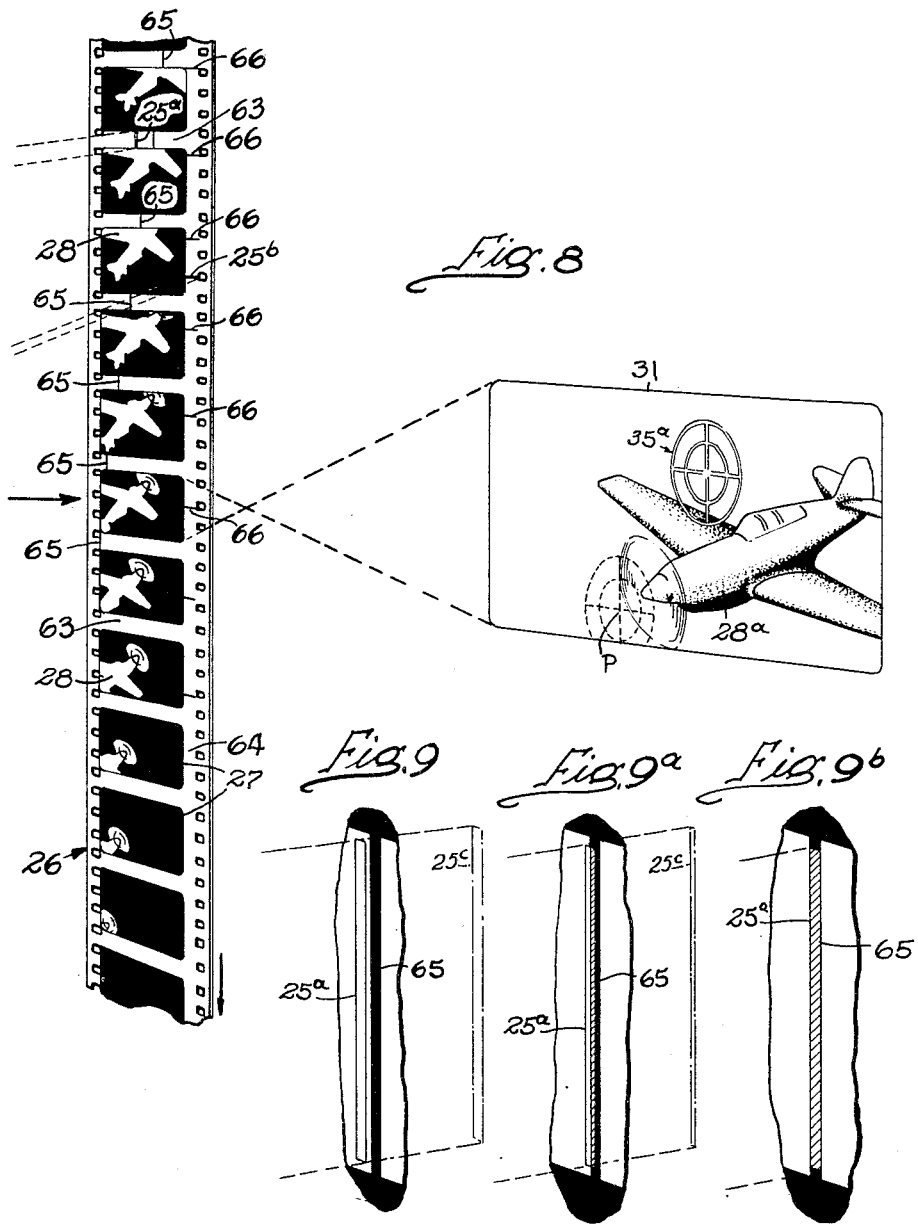

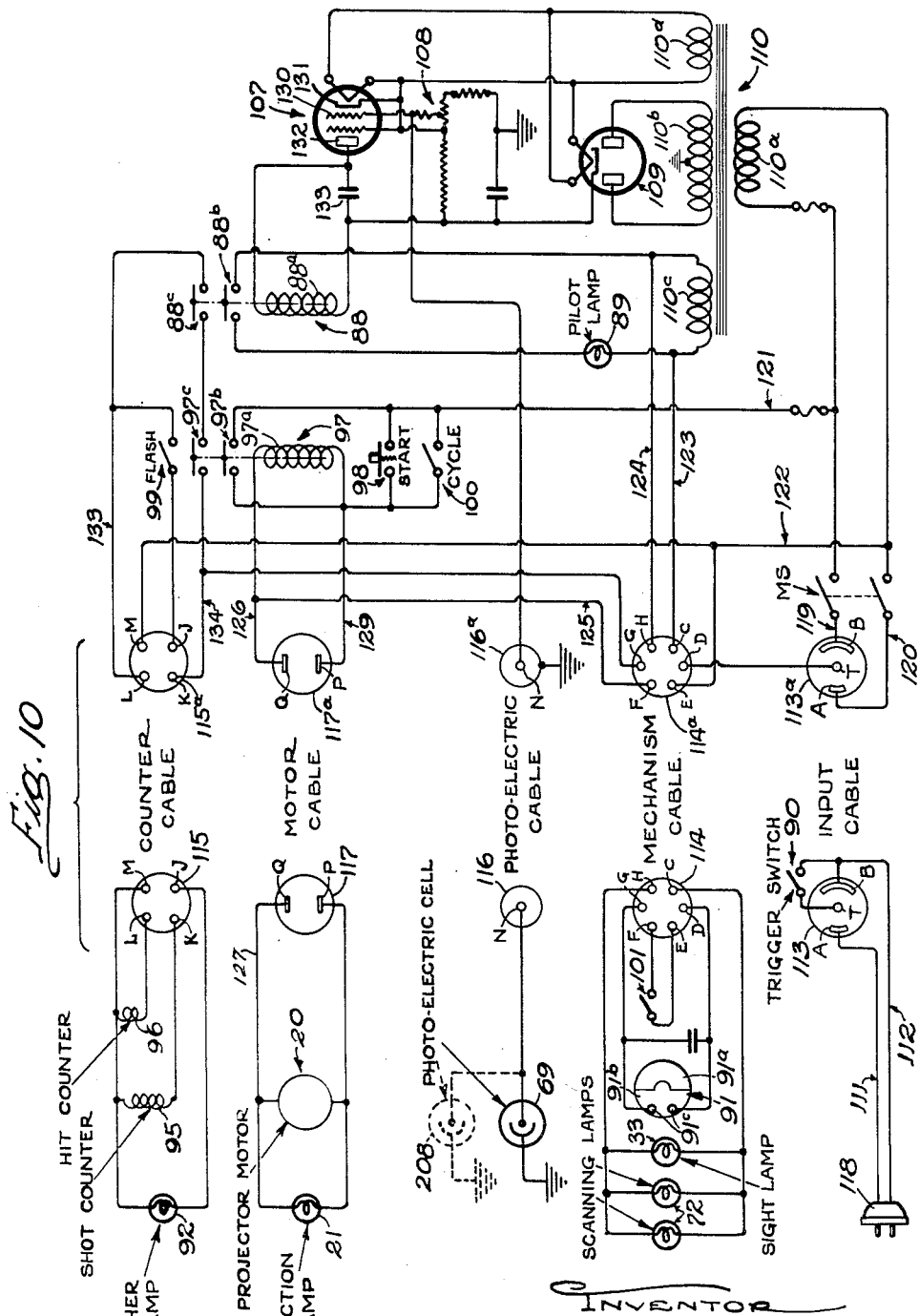

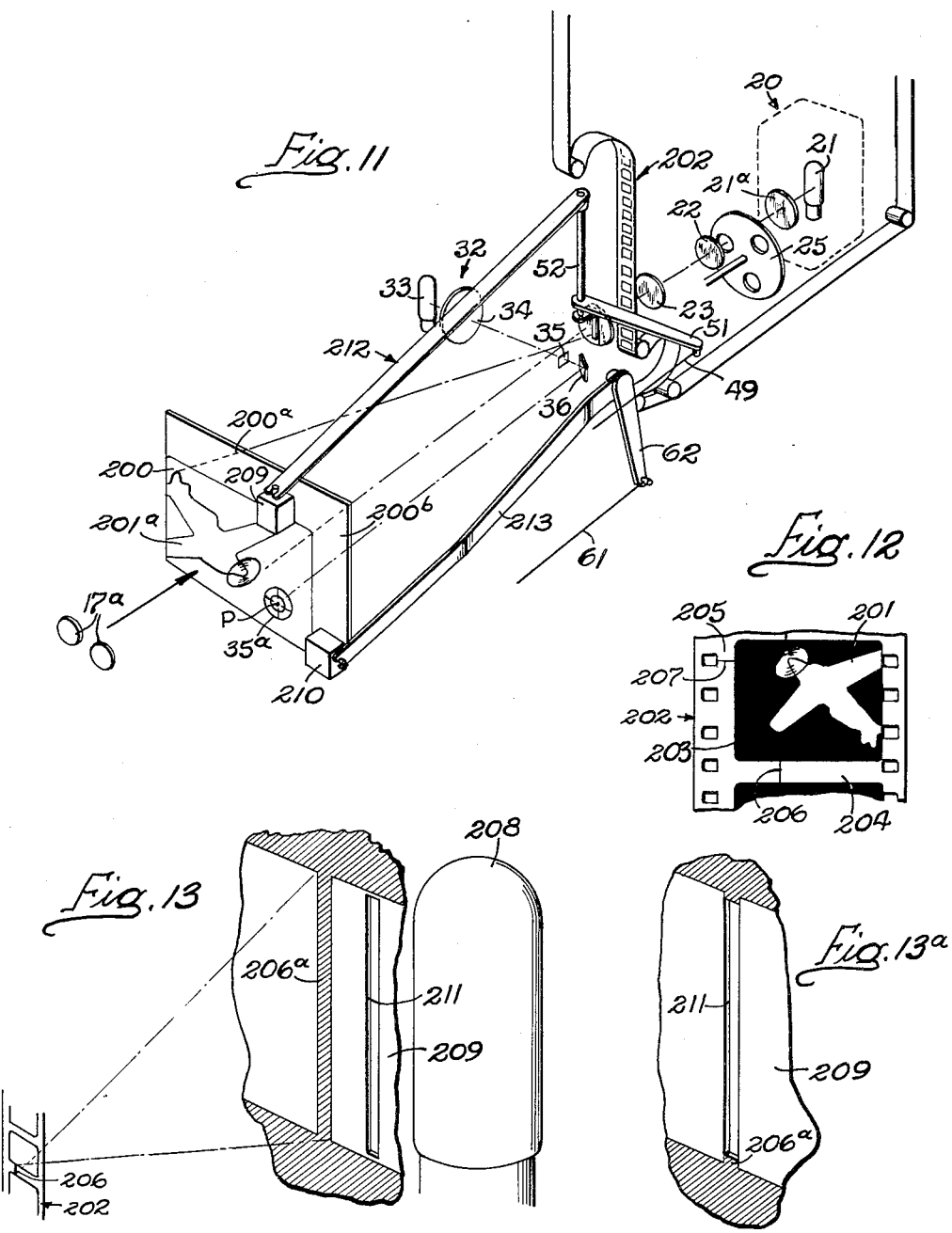

Jan. 1, 1946.   E. W. GOSSWILLER   2,392,142
PANORAMIC TYPE GUNNERY TRAINER
Filed Jan. 8, 1944   7 Sheets-Sheet 7
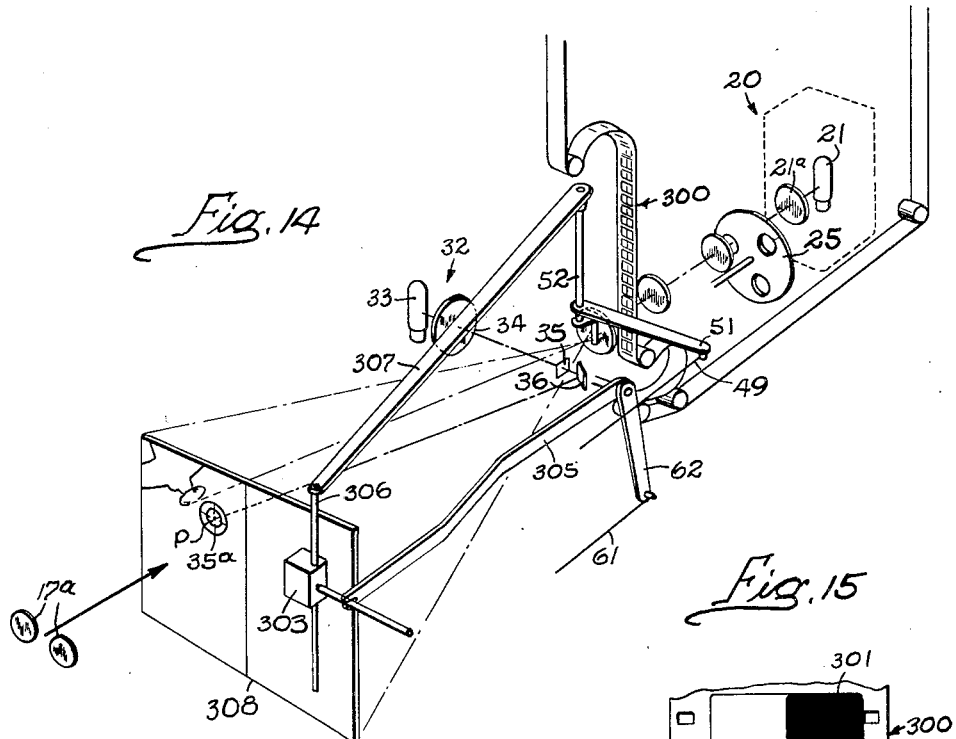
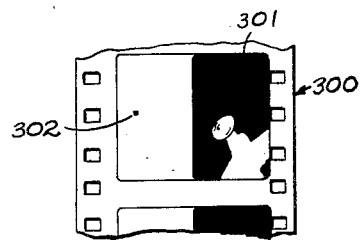
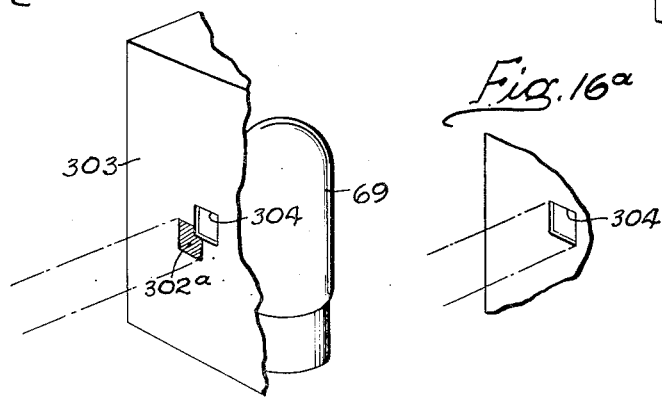
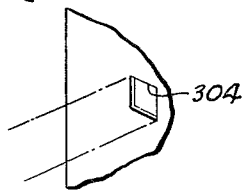
INVENTOR
Earl W. Gosswiller
Carlson, Pitzner, Hubbard & Wolfe
ATTORNEYS Patented Jan. 1, 1946

2,392,142

UNITED STATES PATENT OFFICE 2,392,142

PANORAMIC TYPE GUNNERY TRAINER

Earl W. Gosswiller, Chicago, Ill., assignor to Ruth Ann Wilsey, as executrix of the Last Will and Testament of Irven H. Wilsey Application January 8, 1944, Serial No. 517,542

16 Claims. (Cl. 35—25)

The present invention pertains to a novel panoramic or motion picture type apparatus for simulating the firing of a weapon.

One general object of the invention is to provide such an apparatus which is characterized particularly by its precision and sensitivity of control.

More specifically, it is an object to provide such an apparatus employing a motion picture of a target scene together with light beam control means on the film itself coordinated in position with respect to the target image, and coacting in such manner with a device manipulable by the operator for simulating aiming of a gun at the target image, that when the aiming device is properly aimed by the operator the control means shadows a light sensitive means, or, in other words, eclipses a beam of light otherwise falling on the latter. By virtue of such relation, the sensitivity of the apparatus as a whole is, when utilizing motion picture film developed by ordinary commercial developing processes, greatly increased as compared to one in which illumination (as contrasted with shadowing) of the light sensitive element is correlated with proper aiming.

Still another object is to provide an apparatus of the general character indicated embodying an arrangement for simulating the aiming of a gun by a luminous projection type of sight at a target image thrown on a screen from a motion picture film.

A further object is to provide a novel and improved apparatus of the general character indicated, embodying a pair of scanning beam projectors or scanners arranged to be moved respectively horizontally and longitudinally relative to the motion picture film in accordance with simulated aiming at a target scene projected from the film so that proper aiming may be indicated by registry of light beams from the scanners with correlatively located control coordinates on the film.

The invention also resides in various structural improvements and correlations of the elements of the apparatus by means of which high precision results, accompanied by a high degree of realism, are attained with a compact and readily portable structure.

Further objects and advantages of the invention will become apparent as the following description proceeds, taken in connection with the accompanying drawings in which:

Fig. 8 is a generally schematic representation of the motion picture film, projected target image and sight image, showing the relative location of the light beams and control coordinates when the sight is improperly aimed, and the adjustment necessary to effect proper aiming.

Figs. 9, 9a and 9b are fragmentary detail views of one of the control portions of the film showing, respectively, complete lack of registry of the light beam and control coordinate during improper aiming, partial registration, and complete registration or eclipsing of the light beam by the coordinate.

Fig. 10 is a wiring diagram of the trainer.

Fig. 11 is a schematic representation, similar to Fig. 2, of a modified optical system suitable for use in a trainer embodying the present invention.

Fig. 12 is a fragmentary view of the motion picture film for the device of Fig. 11.

Figs. 13 and 13a are generally diagrammatic representations of the relative location of the shadow of one of the coordinate marks and the associated light beam slit, for the apparatus of Figs. 11 and 12, during, respectively, improper and proper aiming.

Fig. 14 is a generally diagrammatic representation similar to Figs. 2 and 11 and showing a second modified form of optical system suitable for use in trainers embodying the present invention.

Fig. 15 is a fragmentary view of the motion picture film for the device of Fig. 14.

Figs. 16 and 16a are generally diagrammatic representations of the relative location of the shadow of the coordinate mark and associated light beam aperture for the apparatus of Figs. 14 and 15 during, respectively, improper and proper aiming.

The present invention is applicable to target practice apparatus of the amusement type but by reason of the high degree of accuracy which it achieves the invention is suited to actual technical gunnery training and even for that most exacting of fields, aerial gunnery. By way of exemplification, the invention has been illustrated herein as embodied in a form suitable for use in the latter field, but it should be understood that the invention is not, in consequence, to be construed as limited to such application alone. On the other hand, it is my intention to cover all applications, uses, modifications and alternative constructions falling within the spirit and scope of the invention as expressed in the appended claims.

Figure 1:
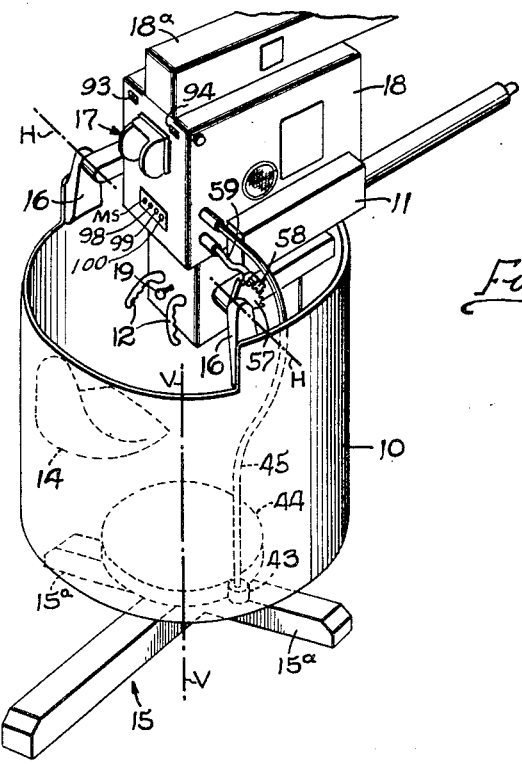
Figure 1 is a general perspective view of a gunnery training apparatus embodying the present invention.

Referring more particularly to the drawings, an exemplary installation is shown in Fig. 1 suited for training machine gunners in firing at aircraft. As there indicated, a turret 10 is provided having a dummy machine gun 11 equipped with hand grips 12 and matching in general structural outline an actual installation on an airplane or the like. The gunner sits in the turret on a seat 14 with his feet braced against the cross arms 15a of a T-shaped base 15 so that he can turn the turret 10 about its vertical axis V—V, the turret being journaled on the base 15 for turning about that axis. Trunnions 16 on the sides of the turret support the gun 11 for vertical motion about a horizontal axis H—H.

The seated gunner looks through a pair of eye pieces 17a (see also Fig. 2) in a viewer 17 in the end wall of a boxlike casing 18 mounted on the gun 11. Housed within this casing is a mechanism for displaying to the gunner a target scene with moving target images such, for example, as a plane maneuvering in combat. As he moves the gun and turret, the gunner has the full illusion of sighting his gun at the target image by reason of a simulated sight which he also sees in conjunction with the target scene and which moves in accordance with his aiming of the gun. Since all else but the target scene and sight are excluded from his range of vision when looking in the viewer, the illusion of size and realism is great. To check the accuracy of his simulated aiming, a light beam type of control is used, co-acting with coordinates positioned on the motion picture film itself in accordance with the proper aiming point for the target image. In the present instance such control is coupled with counter mechanisms and a switch actuated by a trigger or firing button 19 so that a running total is afforded of the "shots" fired and the number of "hits" scored, all in a manner which will hereinafter appear.

Figure 2:
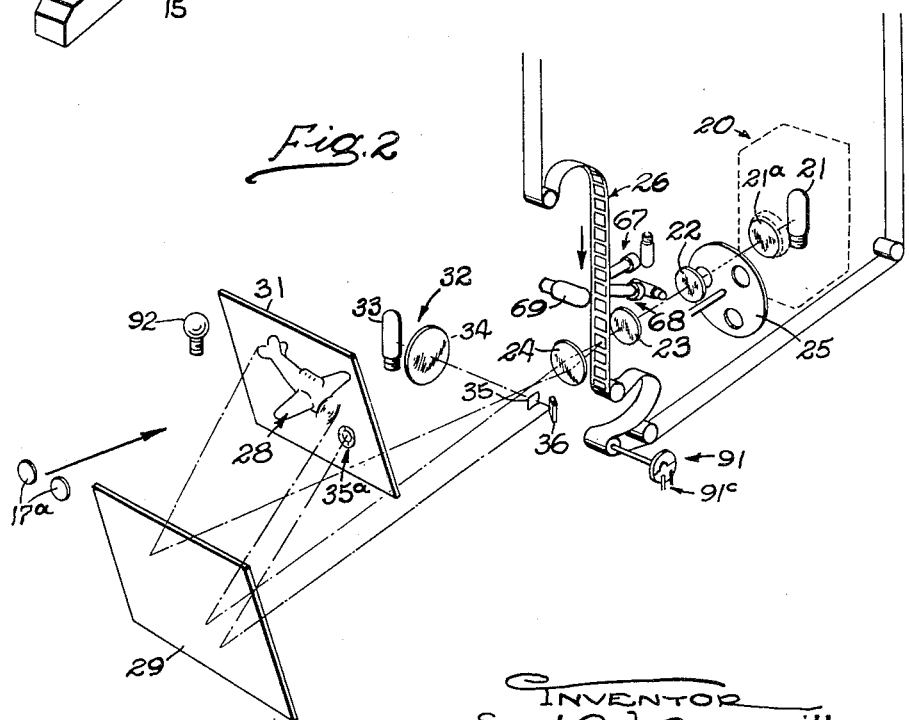
Fig. 2 is a generally schematic representation of the optical system embodied in the trainer of Fig. 1.

Having in mind the foregoing general character of the illustrated apparatus, attention may now be given to somewhat more of its detail and novel aspects. In Fig. 2 is shown schematically the preferred optical system, all of which is suitably housed within the casing 18. It comprises a motion picture projector 20, which may itself be of conventional construction, embodying the usual source of illumination or projection lamp 21, lenses 21a, 22, 23, 24, rotary shutter 25 and synchronized feed mechanism (the latter not being shown) for advancing a motion picture film 26. This film 26 has a succession of frames 27 thereon (see Fig. 8 for a more detailed showing) bearing target images 28 such, for example, as of the airplane indicated. The target image 28 is projected toward a mirror 29 (see Fig. 2 again) mounted in the lower fore portion of the casing 18 and inclined to reflect the incident light rays to a screen 31 also within the casing and positioned for view of the projected image 28a thereon through the eye pieces 17a. By using a mirror type setup with the parts located as described, sufficient length of travel of the projector beam from projector to screen is afforded within a very compact casing and yet the gunner has a direct view of the screen so that a sharp, well-defined image is presented. The eye pieces 17a may comprise lenses to enhance the sense of depth and to compensate for the inclination of the screen.

At the present time luminous projection type sights are commonly in use for automatic weapons installed in aircraft. The herein disclosed trainer embodies an arrangement for simulating such a sight in aiming at the projected target image. In an actual luminous projection type sight a light beam is focused at infinity through a suitable apertured reticle and falls on an inclined transparent glass plate located in front of the gunner. The gunner thus sees a luminous image of the shape defined by the apertures in the reticle but which, in view of the focusing of the beam at infinity, appears to be a luminous image out on the target itself rather than merely a few inches in front of his face.

Figure 3:
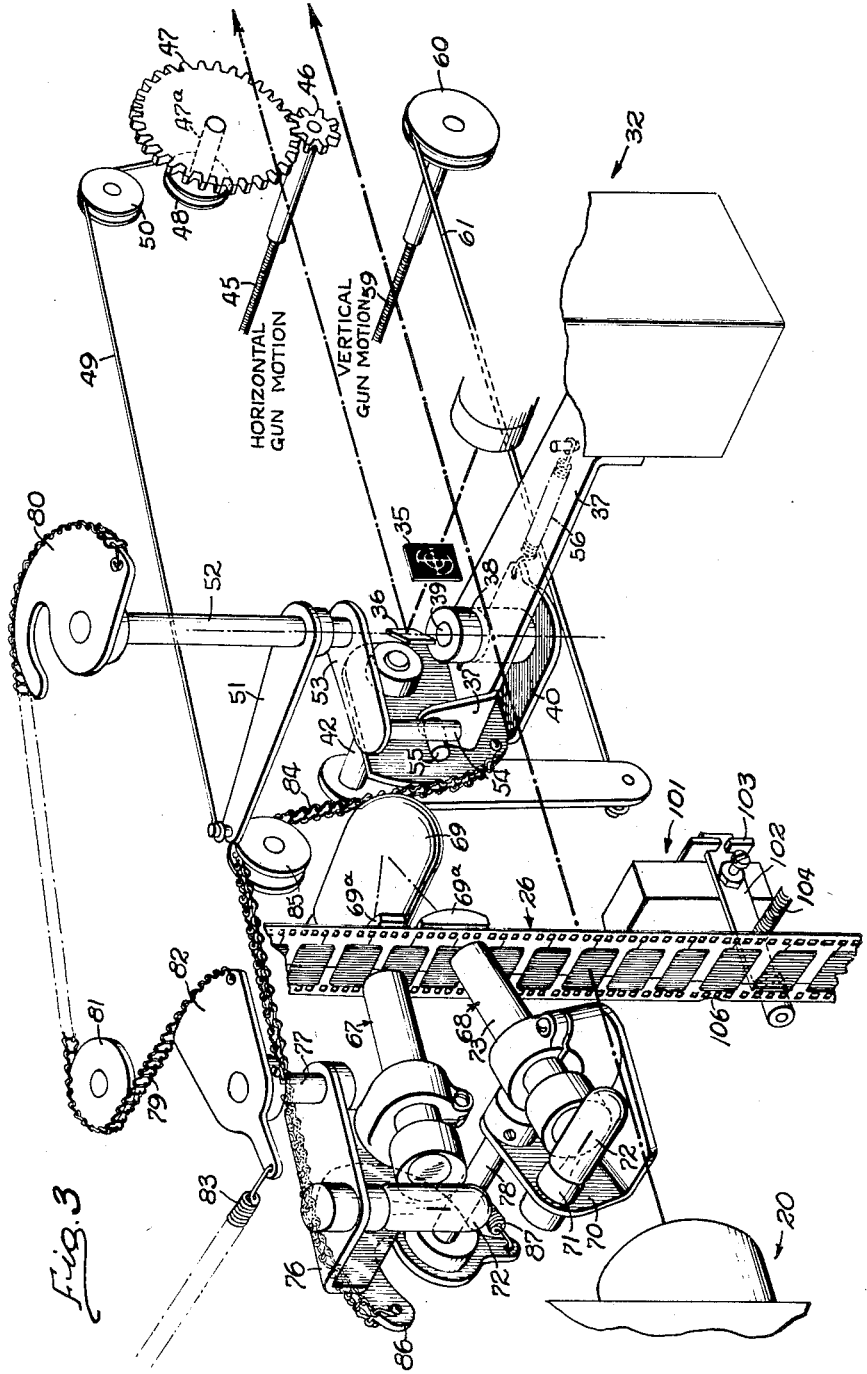
Fig. 3 is a fragmentary perspective view showing a portion of the optical system including the slit type scanning beam projectors and the linkages for actuating the latter.

To simulate such a sight as that just described, a second projector 32 is used in the present gunery trainer. This projector comprises a lamp 33 as a source of illumination and is equipped with a suitable focusing lens 34 for directing a beam of light through a reticle 35 onto an angularly disposed mirror 36. The latter reflects the beam to the main mirror 29 from which it is reflected to the screen 31. The reticle may be of the same form used in the actual luminous projection type sights and may, for example, as indicated in Fig. 3, comprise an opaque mask with two concentric circles cut in it and intersected by vertical and horizontal line slits. In such case a luminous image of the apertures in the reticle 35 appears on the screen 31 as indicated by the sight image 35a in Figs. 2 and 8. By so locating the sight projector 32 laterally of the main motion picture projector 20 and then deflecting its beam by the small mirror 36 the beams from the two projectors may be played on the same screen without bodily interference of the two projector mechanisms.

Figure 7:
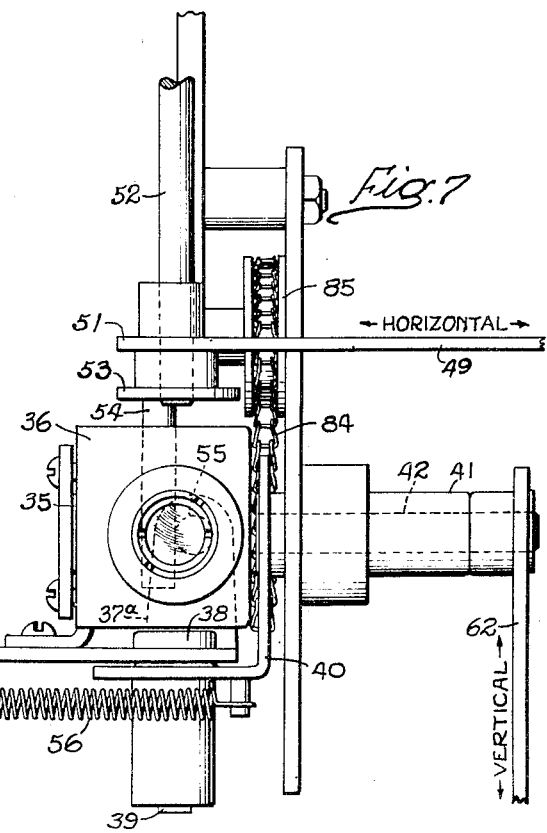
Fig. 7 is a fragmentary side elevation of the sight projecting mechanism and associated linkage for moving it.

Provision is made for shifting the sight image 35a across the target scene on the screen 31 in precise simulation of the movement of such a sight image in the aiming of an actual gun. For that purpose provision is made for shifting the second or sight projector 32 bodily in accordance with the horizontal and vertical motions of the dummy gun 11. Various forms of linkage or mechanical connection may be provided for that purpose. In the present instance (see Figs. 3 and 7) the sight projector 32, reticle 35 and mirror 36 are all fixed to a horizontal arm 37 having a hub 38 rigid therewith and which is journaled on an upstanding pin 39 for lateral swinging motion of the arm. Such pin is fixed to the lower arm of an L-shaped bracket 40. The other or upright arm of this bracket 40 is fixed to a pin 42 disposed at right angles to the first-mentioned pin 39 and aligned with the axis of the light beam from the projector 32 (see Fig. 7), the pin 42 being journaled in a stationary bearing sleeve 41. As the supporting arm 37 is swung laterally about the axis of the upright pin 39 the light beam reflected from the mirror 36 is caused to move laterally of the screen 31, while turning of the bracket 40 and supported projector 32 about the axis of the other or horizontal pin 42 causes the light beam from the mirror to move in a direction vertically of the screen.

To swing the arm 37 laterally about the upstanding pin 39 (Fig. 3) in accordance with horizontal or lateral motion of the dummy gun 11 and turret 10 about the latter's axis V—V, a pinion 43 is carried by the turret and meshed with a stationary gear 44 on the base to roll about such gear as the turret turns (Fig. 1). Fixed to the pinion 43 is a flexible shaft 45 which has on its other end, within the casing 18, a pinion 46 meshing with a gear 47 (Fig. 3). Rigid with the shaft 47a of this gear is a pulley 48 having fixed to it one end of a cord 49 led over an idler pulley 50 and attached at its opposite end to an arm 51 fixed to a shaft 52 coaxial with the pin 39. A second arm 53 also fixed to this shaft 52 has thereon a depending lug or pin 54 engageable with a laterally projecting pin or lug 55 on an upstanding ear 37a on the arm 37. A contractile spring 56 serves to retain the control cord under tension.

Vertical motion of the gun 11 about its axis H—H is transmitted to the sight projector 32 through a mechanical connection including a stationary toothed sector 57 meshed with a pinion 58 (Fig. 1). The pinion 58 is connected to a flexible shaft 59 passing into the casing 18 and having a pulley 60 on its inner end (Fig. 3). Anchored to this pulley is a second control cord 61 which is secured at its other end to an arm 62 rigid with the horizontal shaft or pin 42.

Figure 6:
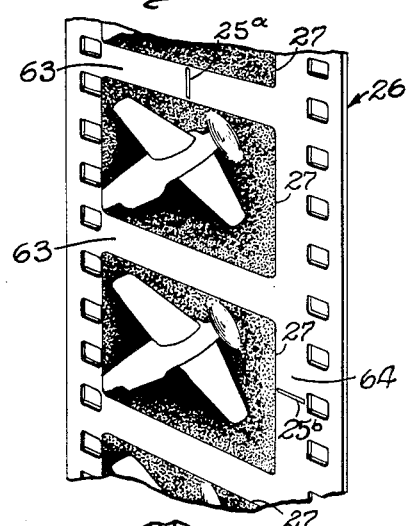
Fig. 6 is a perspective view of a portion of the motion picture film used in the trainer of Figs. 1 to 5.

By means of the connections just described, the sight image 28a is caused to move about the surface of the screen 31 in accordance with the gunner's manipulation of the gun 11, so that he has the complete illusion of actually sighting the gun at the motion picture target image projected onto the screen and can follow its motion with the same facility with which he would follow an actual moving target. Of primary importance is the arrangement for ascertaining the correctness of the gunner's aim, for on that depends the whole value of the instrument. In that connection attention may first be given to the form of film employed. The film (see Fig. 6) is of the shape and size commonly employed for motion pictures and has the usual sprocket holes along its side edges. It may, for example, be a 35 mm. film. On this film is a succession of frames which, as heretofore noted, bear suitable target images 28. However, the film also has a succession of transparent control portions bearing opaque control or coordinate marks correlated in position with respect to the location of the proper aiming point for the target image in corresponding frames of the film. Such "aiming point" corresponds generally to the location of the target image but may be displaced from the latter somewhat to compensate for the apparent speed of the target so that the gunner must employ the aiming requisite for so-called deflection shooting to score a "hit."

In the specific embodiment shown in Fig. 8. the control portions of the film there illustrated comprise transparent rectangular spaces or portions 63 of the film between successive ones of the frames 27, as well as portions 64 extending longitudinally of the film at the sides of successive frames. A pair of opaque coordinate marks 65, 66 is correlated with the target image 28 in each successive frame 27 on the film. One of the pair is located in one of the transverse transparent portions of the film 63, while the other is located in one of the longitudinally extending transparent control portions 64.

As is common in motion picture projectors, the portion of the film actually presented to the projector beam is moved step-by-step with brief pauses after each step, as distinguished from the substantially continuous motion of the film in approaching and leaving the projector. It is desirable that the scanning mechanism for the control portions of the film be located closely adjacent the projector in order that the film may be scanned in the step-by-step portion of its travel. Some spacing of the projector and scanning mechanism along the path of the film is requisite, however, in view of their bulk. To accommodate the necessary spacing of the motion picture projector and slit type beam projectors used in the control apparatus, the coordinate marks 65, 66 are preferably not located immediately adjacent the frame with whose target image they are correlated but are, on the contrary, spaced a preselected number of frames from it. Thus as appears in Fig. 8 one control light beam is passed through the control portion 64 alongside the third frame from that presented to the projector beam, while the other control beam passes through the control portion 63 above the fourth frame from the one being projected. Accordingly, it is the pair of coordinate marks 65, 66 in such control portions that is correlated in position with respect to the proper aiming point for the target image of the frame being projected. In other words, the coordinate marks for each frame are actually located in control portions 63, 64 which are displaced certain numbers of frames away from the frame with which they are correlated.

Figure 4:
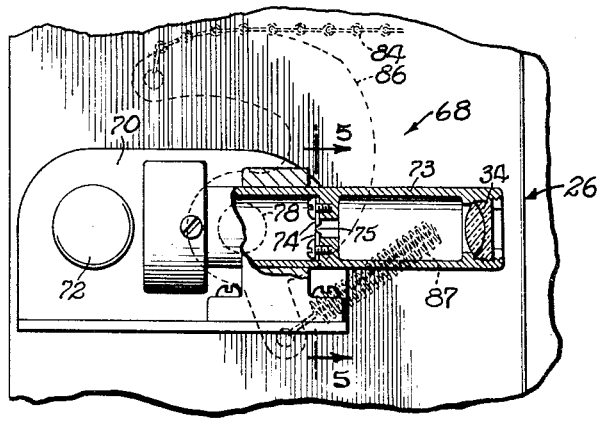
Fig. 4 is a detail side elevation, partially in longitudinal section, of one of the scanning beam projectors.
Figure 5:
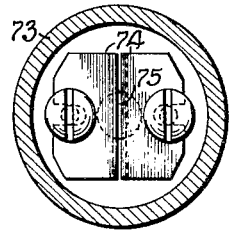
Fig. 5 is an enlarged transverse sectional view taken substantially along the line 5—5 in Fig. 4.

Coacting with the coordinate marks 65, 66 on the film is a pair of slit type light projectors or scanners 67, 68 and a light sensitive element illustrated as a photocell 69 (see Figs. 2 and 3). In general, the arrangement is such that the scanners direct narrow beams of light through the respective transverse and longitudinal control portions 63, 64 of the film 26 and thence through condensing lenses 69a onto the photocell 69. Such scanners 67, 68 are arranged to be moved respectively horizontally and vertically in accordance with the horizontal and vertical movement of the gun 11 in the simulated aiming of the same. When the beams from both scanners 67, 68 are simultaneously intercepted by the corresponding pair of control marks 65, 66, the resultant shadowing of the photocell 69 serves, through the operation of an electric circuit hereinafter described, to condition an indicator for operation In the particular construction shown in Figs. 3, 4 and 5, the two scanners 67, 68 are of identical construction, and accordingly a description of one will serve for both. The scanner 68 is mounted on a bracket 70 of L-shaped cross section having fixed to it a socket 71 receiving a single filament lamp 72 whose light passes through suitable lenses mounted in a tube 73 also fixed to the bracket 70 and directed toward the motion picture film 26. A pair of plates 74 are adjustably fixed within the tube 73 with their opposed edges in closely spaced relation to form a sharply defined slit 75 through which the light may pass. The light is thus directed on the film as a clearly defined slit type beam of approximately the same width as the coordinate marks. Both the beam and coordinate marks may, for example, be of the order of 0.008 inch in width. The slit images from the two scanners are indicated at 25a, 25b in Fig. 6 where they fall on the respective control portions 63, 64 of the film 26.

The scanner 67 is supported for horizontal swinging movement to scan the horizontal or transverse control portions 63 of the film 26, while the other scanner 68 is similarly mounted for vertical swinging movement to scan the longitudinal or vertical control portions 64 of the film. Thus, the mounting bracket 76 of the horizontal scanner 67 (Fig. 3) is fixed to a vertical shaft 77, while the mounting bracket 71 for the vertical scanner 68 is fixed to a horizontal shaft 78. Motion of the control cord 49 is imparted to the horizontal scanner 67 by a connection including a chain 79 fixed to and led about the arcuate periphery of a plate 80 fixed to the upper end of the shaft 52. This chain is led over an idler 81 and its other end is led over the arcuate edge of, and anchored to, a plate 82 on the shaft 77. A contractile spring 83 is also attached to this plate for retaining the chain taut. Similarly, the other control cord 61 is connected to the vertical scanner 68 through the use of a second chain 84. This chain is anchored to the bracket 40, passing up over the arcuate edge of the latter, thence over an idler 85, and finally over the arcuate edge of a plate 86 fixed to the shaft 78 which carries the bracket 70. A contractile spring 87 serves to retain the chain 84 taut.

The coaction of the various control elements in aiming at the target can best be appreciated by reference to Fig. 8. In the latter figure the target image 28, exemplified as a plane, is shown as projected as an image 28a on the screen 31 and the sight image 35a is shown as projected onto the screen at a point somewhat above the plane, thus indicating incorrect aiming. For proper or accurate aiming, the sight image should be centered on the imaginary aiming point P slightly ahead of the rapidly moving plane. Since the sight image 35a is displaced both laterally and vertically from the proper aiming point P, the slit type light beams 25a, 25b from the scanners 67, 68 are commensurately displaced from the corresponding coordinate marks 65, 66 as clearly appears in Fig. 8. In such case both scanner beams pass through the transparent fields 63, 64 on the film 26 in which the coordinate marks are located and fall on the phototube 69 so that the latter is fully illuminated. Upon shift of the gun 11 so that the sight image 35a is moved down to the position indicated in dotted lines in Fig. 8 for registry with the imaginary aiming point P, the light beams from the scanners 67, 68 are correspondingly displaced and register with the respective coordinate marks 65, 66 so that both beams are intercepted. Upon such interception of both beams the phototube 69 is completely shadowed and an indicator is thereby actuated in a manner hereinafter described.

From the foregoing it will be perceived that the accuracy of the instrument in detecting correct aiming is dependent upon the fidelity and exactitude with which it discriminates between precise registry of the scanners' light beams with the coordinate marks on the film and lack of such precise registry. In Fig. 9 one of the scanner beams, indicated in dot-dash lines 25c, and which produces the slit images 25a is shown as completely out of registry with its corresponding coordinate mark 65 and in Fig. 9b as precisely in registry, while in Fig. 9a is shown a condition of partial registry and which is most difficult of all to distinguish from full registry. I have discovered that, surprisingly enough, the precision of discrimination is increased many-fold by using a transparent control portion or field on the film with an opaque coordinate mark located in such field to intercept the beam of light upon proper aiming, as compared to the precision of results obtained when using the reverse arrangement, namely, an opaque control portion or mask on the film with a transparent slit in it which passes light only upon proper aiming. To put it another way, one important key to precision results lies in using shadowing or eclipsing of the light sensitive element to register correct aiming rather than illuminating it to indicate such aim.

The reason why, what at first impression seems but a mere reversal of opaque and transparent areas on the film, eventuates in such a disproportionate difference in results is somewhat obscure. It seems probable, however, that it results at least in part from the difficulty, especially when using mechanical developing processes, of producing an unclouded and sharply defined transparent narrow slit in an opaque field on a film. With motion picture films, reasonable cost of production compels the use of mechanical or machine type developing apparatus. Accurate control of the developing process is in such case difficult enough and when there is added to that the fact that it is impossible for an inspector to judge visually the transparency of a slit a few thousandths of an inch wide, the problem becomes well nigh insoluble. Even a densitometer is of relatively little use in inspecting such a slit. When dealing with such a narrow slit there is a tendency for the opaque emulsion to "bleed" into the slit, rendering it cloudy and varying its transparency. On the other hand, when dealing with a film having large transparent fields on it (such as the control portions 63, 64 illustrated) it is fairly simple to judge their transparency, even visually, in controlling the developing process.

It should be appreciated that by increasing the transparency of the light-passing portion of the film the available discrimination of the apparatus is increased, and, conversely, that a decrease in transparency, or variation in it, diminishes the discrimination sharply. If the portion of the film which is to pass light is cloudy, then a light sensitive system of given sensitivity can discriminate correspondingly less sharply between the condition of Fig. 9a and that of Fig. 9b. By utilizing an opaque coordinate mark in a transparent field of relatively much greater area, as herein disclosed, a highly precise control has been achieved.

Turning next to the matter of electric circuits, a suitable layout for the present trainer is shown in Fig. 10 although it will be clear to those skilled in the art that many variations may be made to suit particular detail requirements without departing from the present invention. In brief, the circuit shown is such that a relay 88 is operated when the gunner is aiming properly at the target, a pilot light 89 serving to apprise an observer or instructor of such condition. Pressure on the firing button or trigger 19 (Fig. 1) closes a trigger switch 90 (Fig. 10) to condition a rotary switch 91 to actuate a shot counter 93 (see Fig. 1) at substantially the normal speed of firing of a machine gun, and each "shot" so fired, while the relay 88 is closed, causes a "hit" to be registered on a hit counter 94, such actuation of the hit counter being accompanied by a flashing of a red lamp 92 (Fig. 10) whose glow is visible in conjunction with the screen 31 (Fig. 2). Both the shot and hit counters 93, 94 may be conventional multi-wheel type counters adapted to be advanced step-by-step upon each successive energization of their respective actuating windings 95, 96.

In addition to the main relay 88 noted above, a second relay 97 is desirably included in the circuit for protective purposes. In general, its function is to prevent operation of the hit counter 94 while the motion picture projector 20 is stopped. Specifically, it prevents a gunner from running up a long string of hits with the motion picture projector stopped and the target image stationary on the screen. Both of the relays 88 and 97 are of the closed when energized type, having respective energizing windings 88a and 97a, as well as respective sets of contacts 88b, 88c and 97b, 97c.

Four manual switches are grouped on the front of the casing 18. These include (see Fig. 10) a double-pole, single-throw "main" switch MS for disconnecting the entire instrument from its current supply, a normally open pushbutton type "start" switch 98, and two single-pole, single-throw switches 99, 100 which serve, respectively, as a "flasher" control switch and a "cycle" control switch. The flasher switch 99 serves simply to open-circuit the flasher lamp 92 and thus disable the same when desired. The cycle switch 100, on the other hand, coacts with a microswitch 101 in a manner hereinafter detailed to condition the instrument alternatively either for a continuous run of the entire motion picture film 26 or automatic stoppage at the conclusion of the running of each successive one of predetermined portions of the same. The microswitch 101 is mounted adjacent the film (see Fig. 3), being of conventional construction, and is spring-biased to closed position. An arm 102 pivoted on a bracket 103 fixed to the switch casing overlies the usual actuating button (not shown) for the switch, being biased away from the same by a contractile spring 104. A roller 105 on the outer end of the arm 102 rides along the edge of the film 26, the latter normally holding the arm in position to depress the switch actuating button so that the switch contacts are closed. When any one of a series of notches 106 in the edge of the film reaches the roller 105, the latter falls into the notch so that the arm 102 moves outward, thereby permitting the switch 101 to open. Similarly, upon breakage of the film the arm 102 springs outward, opening the microswitch.

In view of the feeble current passed by the phototube 69, an amplifier is provided, preferably comprising a so-called trigger type tube having a sharply defined cut-off characteristic such, for example, as the type 2051 gas filled tetrode 107 shown (Fig. 10). The necessary plate and grid bias voltages for this tube are taken from a voltage divider 108 supplied by a conventional full wave rectifier illustrated as including a type 6X5-GT rectifier tube 109. A power transformer 110 supplies current to the rectifier. This transformer is provided with a primary winding 110a and a main secondary winding 110b having a grounded center tap and its end terminals connected to respective ones of the rectifier tube anodes. Additional secondary windings 110c and 110d supply suitable low voltage, respectively, for the control circuits and for the cathode heaters of the two tubes 107 and 109.

In the particular circuit shown, current is furnished by plugging in supply lines 111, 112 to a suitable alternating current source, such as an ordinary 110 volt lighting system. A series of five plugs 113 to 117 and corresponding receptacles 113a to 117a having correlatively lettered terminals interconnect various portions of the circuit to facilitate removal or substitution of various units.

Assuming the terminals of each of the plugs 113—117 to be connected to those of the corresponding receptacles 113a—117a and line plug 118 to be connected to a suitable source of current, the circuit is conditioned for operation by closing the main switch MS. This connects respective ones of the supply lines 111, 112 through terminals A, B conductors 119 and 120, the main switch MS, and conductors 121 and 122 to the terminals of the power transformer's primary winding 110a. Thereupon low voltage current is supplied from the secondary winding 110c through conductors 123, 124 and terminals H, C to the parallel connected scanner lamps 72 and sight projector lamp 33. To condition the flasher lamp 92 for operation the flasher switch 99 is closed, and to condition the instrument for continuous or non-cyclic operation the cycle switch 100 is shifted to its closed position.

As soon as the vacuum tubes 107, 109 have warmed, the instrument may be set in operation simply by momentarily closing the start switch 98. Such momentary closure of the start switch connects the projection lamp and motor across the full supply line voltage in series with the micro switch 101 (through a circuit 122—E—101—F—125—126—G—127—21, 20—128—P—129—98—121). The relay winding 97a, being in shunt with the projection lamp and motor, is simultaneously energized and closes both of its associated sets of contacts 97b and 97c. The contacts 97b are sealing contacts in shunt with the start switch 98 so that the latter may be released without interrupting the circuit.

With the motion picture projector running, the target scene is projected on the screen 31 and the sight image 35a from the second sight projector appears in conjunction with it. The gunner grasps the handles on the gun 11 and by swinging the gun vertically and turning the turret laterally aims at the target image which he sees on the screen, all in the manner heretofore detailed. So long as the sight image 35a is not properly aimed relative to the target image, light from at least one of the scanners 67, 68 will fall on the phototube 69. As shown in Fig. 10, the phototube 69 is connected between the control grid 130 of the tube 107 and ground so that light on the phototube makes the grid more negative, thus biasing the tube to cut-off so that no current flows from its cathode 131 to its anode 132. The actuating winding 88a of the main relay 88 is connected in the output circuit of the amplifier tube (i. e., between anode and cathode) in shunt with protective condenser 133 and its two pairs of contacts 88b and 88c remain open so long as the winding 88a is deenergized, as is the case when light is falling on the phototube. Upon shadowing of the phototube 69 by interception of both beams of scanning light by the corresponding coordinate marks 65, 66, and which takes place when the aim is proper as described above, the control grid 130 of the tube becomes less negative so that the tube passes current, thereby energizing the relay winding 88a. The resultant closure of the contacts 88b completes a circuit for the pilot lamp 89 mounted on the exterior of the instrument casing and thus indicates to the instructor or supervisor that the gunner's aim is correct.

To complete the simulation of actual firing, the trigger switch 90 is so arranged that it must be closed at the instant of proper aiming in order to register a "hit." On the other hand, the shot counter affords a measure of the number of "shots" fired so that a comparison of the readings of the hit and shot counters 93, 94 gives an exact measure of the accuracy of fire. In brief, the arrangement is such that whenever the trigger switch 90 is closed the shot counter will be advanced a rate corresponding to ordinary rate of fire for the gun being simulated, while the hit counter is also advanced one step for each shot impulse in the circuit that takes place while the gunner is accurately aiming at the target.

The actuating winding 95 of the shot counter is in series with the trigger switch 90 and rotary switch 91 in order that impulses be fed to such winding at a suitable rate whenever the trigger switch is closed. The rotary switch 91, which determines the rate of fire, may consist of a disk composed of conductive and insulating segments 91a, 91b driven in timed relation with the motion picture projector, as, for example, from one of the film sprockets (Fig. 2). The segments 91a, 91b alternately close and open a circuit between an overlying pair of stationary brushes 91c. Each time the conductive segment 91a comes under these brushes, when the trigger switch 90 is closed, the shot counter is advanced one step by the flow of a current impulse through its actuating winding 95 (the circuit being 111—A—120—MS—122—M—95—K—G—91—D—T—90—112).

Should the aim be incorrect when the trigger switch 90 is closed, only the shot counter 93 is actuated. But should the aim be correct, so that relay 88 is picked up, then each impulse of current passed by the rotary and trigger switches also energizes the hit counter 96 and flasher lamp 92. In such case the energizing circuit for the hit indicator winding 96 is 111—A—120—MS—122—M—96—L—133—88c—97c—134—G—91—D—T—90—112. Inclusion of the relay contacts 97c in this circuit makes it certain that hits cannot be scored except when the motion picture projector 20 is running for the relay 97 is in shunt with such projector's motor and hence picked up only when the projector is in operation. The flasher lamp 92 is energized coincidentally with the winding 96, but through a separate circuit (111—A—120—MS—122—M—92—J—99—88c—97c—134—G—91—D—T—90—112) so that it may be disabled by opening switch 99 without disabling the circuit for the winding 96.

From the foregoing it will be seen that there is a complete simulation of the manipulations requisite for proper aiming and firing of the gun. The gunner must not only aim correctly at the moving target image projected from the motion picture film, but must, in addition, press the trigger for firing at the time such correct aim prevails in order to score hits. Since there is a separate indicator (pilot lamp 89) for accuracy of aim alone, the instructor can readily determine whether a bad score results from faulty aim or faulty timing in firing. As heretofore noted, comparison of the readings of the shot counter 93 and hit counter 94 affords an accurate record of the percentage of hits scored relative to the number of shots fired. Desirably, a tabulation is furnished with each film showing the maximum potential number of shots that may be fired with a target in range so that a comparison of such total with the total shown by the shot counter will indicate to the instructor whether or not the gunner is attempting the more difficult shots or simply withholding his fire until he sees an easy chance in order to build up an imposing percentage of hits.

When all of the film has passed through the projector, the microswitch operating arm 102 is freed to spring outward to open the switch (101), thereby dropping out the relay 97 and open-circuiting the projector motor to bring the machine to a stop. The usual supply and take-up reels (not shown) for the motion picture film may be mounted in an auxiliary housing 18a located on the top of the main casing 18 (see Fig. 1) and fresh films may be threaded in the machine from time to time as required.

In some instances it may be desirable to operate the machine cyclically or, in other words, in such manner that it is brought to a stop after each successive one of predetermined portions of the film have been run. In that way the number of shots and percentage of hits can be checked for the various portions of the film, some of which may present more difficult shots or different types of shots than others. When such operation is desired the cycle switch 100 is shifted to its open position. It will be recalled that in the preceding description of operation the cycle switch was assumed to be closed. A notch, like the notch 106 in Fig. 3, is provided on the edge of the film 26 at the end of each of the desired predetermined sections of the same. Whenever one of these notches reaches the roller 105 the latter falls into the notch, thus permitting the microswitch 101 to open and thereby drop out the relay 97 as well as stopping the projector motor. To restart the machine the start button 98 is momentarily depressed, starting the machine in the manner heretofore described. At the end of each section of film the machine again stops automatically. On the other hand, when the cycle switch 100 is closed (for non-cyclic operation) even should the film 26 be notched, the opening of the microswitch 101 incident to dropping of the roller 105 into one of the notches 106 is immediately succeeded by a reenergization of the relay 97 and restarting of the projector motor through the circuit completed through the closed cycle switch. The latter switch thus readily conditions the machine for either intermittent or continuous operation.

Rather than scanning the light control areas on the film directly with scanning beams passing through the film itself onto one or more phototubes as described above, provision may, if desired, be made for projecting the coordinate marks and utilizing a pair of phototubes or other light sensitive means remote from the film and at the point where the marks are projected. Such an arrangement is shown in Fig. 11. It has the advantage that the placing of the coordinate marks on the film is somewhat simplified since each pair of coordinate marks is located directly alongside the frame with whose image they are correlated rather than being stepped several frames away to accommodate the bulk of the scanning mechanism and projector in the manner previously described in connection with the film of Fig. 8. The modified arrangement of Figs. 11 to 13 has the relative disadvantage, however, that it utilizes a translucent screen 200 upon one side of which a target image 201a is projected from a film 202 and which is viewed from the opposite side so that the projected image may not appear with such clarity and sharpness as is the case with a direct viewing of the screen as in Fig. 2.

In the modified arrangement shown in Fig. 11, the general construction of the apparatus may be the same as that previously described and the same motion picture projector 20, as well as the same sight projector 32, may be used. Aside from the change in location of the coordinate marks noted, the motion picture film 202 is like the film 26 heretofore described. Thus the film 202 (see Fig. 12) has a succession of frames 203 bearing target images 201. Between successive frames are transparent control portions or fields 204 and alongside each frame is transparent control portion 205. Pairs of opaque coordinate marks 206, 207 are located in these transparent portions, correlated in position with the respective lateral and vertical displacement of the correct aiming point P for the target image; in this case, for the target image in the immediately adjacent frame.

By way of difference in apparatus, however, two phototubes 208 are employed, mounted in respective light tight housings 209, 210 having slits in their faces adjacent the projector, the slit in the housing 209 being vertical to match the vertically extending coordinate marks 206 on the film, and that in the other housing 210 being horizontal to match the other or horizontally extending control marks 207 on the film. One of the phototubes 208 and the portion of its housing 209 slitted at 211 appears in Figs. 13 and 13a. So far as the electric circuit is concerned, the only alteration in circuit connections required to accommodate the two-phototubes set-up of Fig. 11 is to connect the second phototube 208 in parallel with the first tube 69 as indicated in dotted lines in Fig. 10. Since the projection lamp 21 of the main motion picture projector 20 itself is used to illuminate the phototubes, the scanning lamps 72 may be omitted from the circuit.

The screen 200 is preferably larger in dimension than the target scene to be projected and may be masked along the dotted line shown so that only the target scene is visible to the gunner through the eye pieces 17a. The gate of the projector is large enough, however, so that both the adjacent horizontal and longitudinal control portions of the film immediately adjacent the frame being projected are projected into the top and side edge portions 200a and 200b of the screen. The phototube housings 209, 210 are mounted behind such portions of the screen on the forward end of respective arms 212 and 213 and are received by suitable guides (not shown) for respective horizontal and vertical motion. The arm 212 is fixed to the upper end of the shaft 52 which is oscillated by the linkage heretofore described in unison with lateral traverse of the gun 11 and sight projector 32. Similarly, the other arm 213 is connected to the linkage arm 62 for vertical motion in unison with the vertical movement of the gun and sight projector.

In the event of an improper aiming of the sight image 35a relative to the target image 201a, the projected image or shadow of the coordinate marks 206, 207 are out of registry with the slits in the phototube housings 209, 210, such lack of registry of the shadow 206a cast by the control mark 206, relative to the slit, being shown in Fig. 13. As the sight image 35a is shifted to the correct aiming point the projected coordinate marks come into registry with the slits (see Fig. 13a) so that the phototube is shadowed. Coincident shadowing of the two phototubes acts, just as before, to render the bias on the control grid 130 of the amplifier tube 107 less negative to an extent sufficient to cause the amplifier tube to pass current. In other respects the operation of the apparatus is the same as that heretofore described.

As still another variant, a single coordinate mark per frame on the motion picture film may be used rather than a pair of marks as heretofore described, such a film, designated as 300, being shown in Fig. 15. In the latter film a succession of target image frames 301 is provided on the film just as before but in this instance they occupy only about one-half the available width of the film. Alongside this series of target frames is a transparent area on the film extending longitudinally of the same and in the portion alongside each frame is a control mark 302 located both laterally and longitudinally of such portion in accordance with the position of the aiming point for the target image in the adjacent frame. The apparatus of Fig. 14 is adapted for use with such a film as that of Fig. 15. The arrangement is substantially like that shown in Fig. 11 and heretofore described except that a single phototube 69 is provided and mounted in a single light-tight housing 303 having a small hole or aperture 304 in its wall adjacent the projector, such aperture being shaped to match the shape of the coordinate mark 302 on the film 300 (square in this instance).

The housing 303 is pivotally mounted on the forward end of an arm 305 and slidable on a rod 306 depending from the forward end of a second arm 307. The arms 305 and 307, like the arms 212 and 213 of Fig. 11, are arranged to move, respectively, horizontally and vertically in unison with the lateral and vertical motion of the sight image and gun. Light from the projector lamp 21 passes through the control portion of the film and is directed to the space alongside the screen 308 traversed by the housing 303. So long as the sight image is improperly aimed relative to the aiming point for the projected target image, the shadow of the coordinate mark 302 is out of registry with the housing aperture 304 (Fig. 16). Upon proper aiming, however, the coordinate mark registers with the aperture, thus shadowing the phototube (Fig. 16a). The electric circuit for use with such an arrangement as that of Fig. 14 may be identical with that shown in Fig. 10 and heretofore described.

I claim as my invention:

1. In a gunnery practice apparatus, the combination of a motion picture film having a succession of frames bearing target images adapted to be projected as well as a succession of opaque coordinate marks in transparet fields on the film and located in such fields in correlation with the two-dimensional displacement of the target image from the frame margins in corresponding ones of said frames, a source of illumination, a light sensitive device, a device manipulable in simulation of the aiming of a gun at a target image projected from said film, and means actuated in unison with said aiming device for effecting a relative movement between said source and said light sensitive device to cause interruption of a beam from the source to the latter by said coordinate marks only when the aiming device is accurately aimed relative to the projected target image.

2. In a gunnery practice apparatus, the combination of a motion picture film having a succession of frames bearing target images adapted to be projected, as well as a succession of pairs of opaque coordinate marks, one pair of each frame, said coordinate marks being located in transparent fields on the film and positioned in such fields with one mark in each pair correlated with the lateral displacement of the target image in a corresponding frame and the other mark correlated with the vertical displacement of the target image in a corresponding frame, a source of illumination, a light sensitive device, an aiming device manipulable in simulation of the aiming of a gun at a target image projected from said film, and means actuated in unison with said aiming device for effecting a relative movement between said source and said light sensitive device to cause interception of all light from the source to said light sensitive device by a pair of said coordinate marks only when the aiming device is accurately aimed both laterally and vertically relative to the projected target image.

3. In a gunnery practice apparatus, the combination of a motion picture film having a succession of frames thereon bearing target images as well as a succession of opaque coordinate marks on transparent fields and located in the latter in correlation with the two-dimensional displacement of the target image from the frame margins in corresponding ones of said frames, a projector for said film, means for applying a concentrated beam of light to the film, a device manipulable to simulate the aiming of a gun at a target image projected from said film, means for shifting said beam relative to the film in unison with the motion of said aiming device, an electric circuit, and means for altering the energization of said circuit in response to interruption of said beam by said coordinate marks on the film.

4. In a gunnery practice apparatus, the combination of a motion picture film having a succession of frames thereon bearing target images as well as a succession of pairs of opaque coordinate marks, one pair for each frame, said coordinate marks being located in transparent fields on the film and positioned in such fields in correlation with the two-dimensional displacement of the target image from the frame margins in corresponding ones of said frames, a projector for said film, means for applying two concentrated beams of light to the film, a device manipulable to simulate the aiming of a gun at a target image projected from said film, means for shifting said beams relative to the film in accordance with, respectively, the lateral and vertical motion of said aiming device, an electric circuit, and means for altering the energization of said circuit in response to the simultaneous interception of both of said beams by corresponding ones of a pair of coordinate marks on the film.

5. In a gunnery practice apparatus, the combination of a motion picture film having a succession of frames thereon bearing target images as well as a succession of pairs of opaque coordinate marks, one pair for each frame, said coordinate marks being located in transparent fields on the film and positioned in such fields in correlation with the two-dimensional displacement of the target image from the frame margins in corresponding ones of said frames, a projector for said film, means for applying two concentrated beams of light to the film, a device manipulable to simulate the aiming of a gun at a target image projected from said film, means for shifting said beams relative to the film in accordance with, respectively, the lateral and vertical motion of said aiming device, an electric circuit, a single phototube, means for focusing on said phototube such portions of both of said concentrated beams as pass through the film, and means for altering the energization of said electric circuit upon the simultaneous shadowing of said phototube by both of a pair of coordinate marks on the film intercepting respective ones of said beams.

6. In a gunnery practice apparatus, the combination of a motion picture film having a succession of frames bearing target images, said film also having a plurality of pairs of transparent fields, one field of each pair extending transversely of the film between adjacent frames and the other extending longitudinally of the film alongside a frame, each of said fields having an opaque coordinate mark therein, those in the fields between frames being positioned laterally of the film in accordance with the lateral displacement of the target image in corresponding frames and those in the marginal fields being positioned longitudinally of the film in accordance with the vertical displacement of the target image in corresponding frames, a motion picture projector for said film, a pair of independently movable scanners disposed to direct concentrated beams of light respectively on the transverse and longitudinal transparent portions of the film at points closely adjacent said projector, a device manipulable to simulate the aiming of a gun at a target image projected from said film, means for shifting said scanners respectively transversely and longitudinally of the film in accordance with the lateral and vertical motion of said aiming device, a single phototube disposed to receive light from both of said scanners, an electric circuit, and means for altering the energization of said circuit upon the simultaneous shadowing of said phototube by both of a pair of coordinate marks on the film intercepting respective ones of said beams.

7. In a gunnery practice apparatus, the combination of a motion picture film having a succession of frames bearing target images adapted to be projected as well as a succession of opaque coordinate marks in transparent fields on the film and located in such fields in correlation with the two-dimensional displacement of the target image from the frame margins in corresponding ones of said frames, a screen, a projector for projecting said target images on said screen and for also projecting said coordinate marks, a light sensitive device movably mounted in position for projection thereon of said coordinate marks, a device manipulable in simulation of the aiming of a gun at a target image projected on said screen, and means actuated in unison with said aiming device for moving said light sensitive element into position for shadowing of the same by a projected coordinate mark only when said aiming device is accurately aimed relative to the target image projected on the screen.

8. In a gunnery practice apparatus, the combination of a motion picture film having a succession of frames bearing target images adapted to be projected, as well as a succession of pairs of opaque coordinate marks, one pair for each frame, said coordinate marks being located in transparent fields on the film and positioned in such fields with one mark in each pair correlated with the lateral displacement of the target image in a corresponding frame and the other mark correlated with the vertical displacement of the target image in a corresponding frame, a screen, a motion picture projector for projecting said target images on said screen and for also projecting said coordinate marks, a pair of light sensitive devices positioned to move respectively through the range of movement of corresponding ones of the projected coordinate marks, a device manipulable in simulation of the aiming of a gun at a target image projected on said screen, and means actuated in unison with said aiming device for moving said light sensitive elements to bring the same into position to be shadowed by respective ones of said coordinate marks when the aiming device is accurately aimed relative to the target image projected on the screen.

9. In a gunnery practice apparatus, the combination of a motion picture film having a succession of frames bearing target images adapted to be projected as well as a succession of opaque coordinate marks in transparent fields on the film and located in such fields in correlation with the two-dimensional displacement of the target image from the frame margins in corresponding ones of said frames, a projector for projecting said target images and for also projecting said coordinate marks, a single light sensitive device movably mounted in position for projection thereon of said coordinate marks, a device manipulable in simulation of the aiming of a gun at a target image projected on said screen, and means actuated in unison with said aiming device for moving said light sensitive element both laterally and vertically in accordance with the lateral and vertical motion of said device to bring said light sensitive element into position for shadowing of the same by a projected coordinate mark only when said aiming device is accurately aimed relative to the target image projected on the screen.

10. In a gunnery practice apparatus, the combination of a film having a target image thereon, a screen, a first projector for projecting on said screen a target image from said film, a second projector including a source of illumination and a mask apertured to duplicate the pattern of a luminous type projection sight, an aiming device manipulable to shift said second projector at will and thereby move the sight image produced by it across said screen, and means including light beam control areas on said film coordinated in position with the target image thereon for indicating correct aiming of said device relative to the projected target image.

11. In a gunnery practice apparatus, the combination of means including a motion picture projector for projecting a target scene, a second projector disposed laterally of the first and in position to direct a beam of light closely adjacent the mean path of light from the first projector and substantially at right angles thereto, a mirror disposed to deflect the beam from the second projector into substantial parallelism with the mean path of light from the first, whereby light from both projectors will fall in a common field, a reticule disposed to impose a sight pattern on the beam from the second projector, a device for simulating the aiming of a gun at a target scene projected by the first projector, means rigidly connecting said second projector and mirror and reticule for movement as a unit, and means for turning said unit in response to corresponding manipulations of said aiming device respectively about one axis coincident with the beam from the second projector to the mirror and about a second axis at right angles to the first and intersecting the latter at said mirror.

12. In a gunnery practice apparatus, the combination of a casing having a screen therein, a viewer for the screen including an eyepiece in a wall of the casing substantially opposite the screen, a projector within said casing for projecting a motion picture target scene from a film, said projector being positioned to face generally toward said wall of the casing and being more remote therefrom than said screen, said projector being laterally offset from the line of sight between said eyepiece and screen, a mirror disposed within said casing to reflect onto said screen an image projected from said projector, a "hit" indicator, light sensitive means adapted to coact with light beam control areas on a film fed through said projector for conditioning said indicator for operation, an illumination source for passing light through the film toward said light sensitive means, a second projector movably mounted within said casing for producing on said screen a luminous sight image, and means manipulable from the exterior of said casing in simulation of the aiming of a gun for moving said second projector and for effecting in unison with such movement a relative movement of said source and light sensitive means.

13. In a gunnery practice apparatus, the combination of a casing having a screen therein, a viewer for the screen including an eyepiece in a wall of the casing substantially opposite the screen, a projector within said casing for projecting a motion picture target scene, said projector being positioned to face generally toward said wall of the casing and being more remote therefrom than said screen, said projector being laterally offset from the line of sight between said eyepiece and screen, and a mirror disposed within said casing to reflect onto said screen an image projected from said projector.

14. In a target practice apparatus, the combination of a motion picture projector for projecting a motion picture target image, a device for simulating the aiming of a gun at the projected target image, a "hit" register, means coacting with said device for actuating said register periodically when said device is accurately aimed relative to the target image, and means for automatically preventing actuation of said register except when said projector is running.

15. In a target practice apparatus, the combination of a motion picture projector having an electric drive motor for projecting a motion picture target image, a device for simulating the aiming of a gun at the target image, a first relay, means for energizing said relay when said device is accurately aimed relative to the target image, a "hit" register, energizing means operable in response to the energization of said first relay for periodically actuating said register, and means including a second relay energized in coincidence with the energization of said projector motor for disabling said energizing means against actuation of said register except when said second relay is energized.

16. In a target practice apparatus, the combination of a motion picture bearing a sequence of target images and a motor-driven projector therefor, a device for simulating the aiming of a gun at the projected target image, means for indicating accurate aiming of said device, a start switch, means operable in response to momentary actuation of said switch for starting said projector, said film having notches in the edge thereof located at predetermined points along its length, a roller, means yieldably urging said roller into engagement with the edge of the film as it passes through the projector, and means operable in response to bodily movement of said roller incident to its dropping into one of said notches or breakage of the film for stopping said projector.

EARL W. GOSSWILLER.